(12) United States Patent
Azar et al.

(10) Patent No.: US 12,149,137 B2
(45) Date of Patent: Nov. 19, 2024

(54) ELECTRICAL MACHINE HAVING A SEGMENTED STATOR OR ROTOR

(71) Applicant: Siemens Gamesa Renewable Energy A/S, Brande (DK)

(72) Inventors: Ziad Azar, Sheffield (GB); Alexander Duke, Sheffield (GB); Liren Huang, Sheffield (GB); Zi-Qiang Zhu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 208 days.

(21) Appl. No.: 17/770,065

(22) PCT Filed: Oct. 9, 2020

(86) PCT No.: PCT/EP2020/078454
§ 371 (c)(1),
(2) Date: Apr. 19, 2022

(87) PCT Pub. No.: WO2021/078542
PCT Pub. Date: Apr. 29, 2021

(65) Prior Publication Data
US 2022/0393536 A1 Dec. 8, 2022

(30) Foreign Application Priority Data
Oct. 23, 2019 (EP) .................... 19204807

(51) Int. Cl.
*H02K 3/28* (2006.01)
*F03D 9/25* (2016.01)
*H02K 7/18* (2006.01)

(52) U.S. Cl.
CPC ............ *H02K 3/28* (2013.01); *F03D 9/25* (2016.05); *H02K 7/1838* (2013.01); *F05B 2220/706* (2013.01); *H02K 2213/12* (2013.01)

(58) Field of Classification Search
CPC .... H02K 3/28; H02K 7/1838; H02K 2213/12; F03D 9/25; F05B 2220/706
See application file for complete search history.

(56) References Cited

U.S. PATENT DOCUMENTS

| 8,536,754 B2 | 9/2013 | Dajaku |
| 2007/0040466 A1* | 2/2007 | Vollmer ................ H02K 17/18 310/212 |

(Continued)

FOREIGN PATENT DOCUMENTS

| CN | 102177640 A | 9/2011 |
| CN | 102577036 A | 7/2012 |

(Continued)

OTHER PUBLICATIONS

International Search Report & Written Opinion for PCT/EP2020/078454 issued Jan. 19, 2021.

(Continued)

*Primary Examiner* — Forrest M Phillips
(74) *Attorney, Agent, or Firm* — Schmeiser, Olsen & Watts LLP

(57) ABSTRACT

A stator segment for the stator or the rotor of an electrical machine is provided including: two end teeth at two respective circumferential ends, a plurality of N intermediate teeth, N being an integer greater than 1, a plurality of N+1 slots circumferentially distributed between the two end teeth, each pair of circumferentially adjacent intermediate teeth having a slot interposed therebetween, a slot being provided between each end tooth and a respective circumferentially adjacent intermediate tooth, at least one 2-pitch coil, the 2-pitch coils being in the number of N−1 and extending between an i-th slot and a (i+2)-th slot, the slots being progressively counted from one to the other of the two circumferential ends, i being an integer between 1 and N−1.

8 Claims, 3 Drawing Sheets

(56) References Cited

U.S. PATENT DOCUMENTS

| | | |
|---|---|---|
| 2012/0001512 A1 | 1/2012 | Dajaku |
| 2012/0228981 A1 | 9/2012 | Dajaku |
| 2014/0346919 A1 | 11/2014 | Wu et al. |
| 2016/0308415 A1 * | 10/2016 | Dajaku .................. H02K 1/16 |
| 2021/0083533 A1 | 3/2021 | Azar et al. |

FOREIGN PATENT DOCUMENTS

| | | | |
|---|---|---|---|
| CN | 104184223 A | 12/2014 | |
| CN | 105162271 A | 12/2015 | |
| CN | 105284033 A | 1/2016 | |
| CN | 105680585 A | 6/2016 | |
| CN | 106899108 A | 6/2017 | |
| CN | 105 680 585 B | 9/2018 | |
| CN | 111937276 A | 11/2020 | |
| EP | 3557733 A1 * | 10/2019 | ............ H02K 1/148 |
| WO | WO-2011015606 A1 * | 2/2011 | ............ H02K 1/165 |

OTHER PUBLICATIONS

Keyi Wang et al.; "Novel Fault-Tolerant Stator Structure for Modular PMSMs with Fractional-Slot Overlapping Winding"; 20th International Conference on Electrical Machines and Systems (ICEMS); 2017.

* cited by examiner

ELECTRICAL MACHINE HAVING A SEGMENTED STATOR OR ROTOR

CROSS-REFERENCE TO RELATED APPLICATIONS

This application claims priority to PCT Application No. PCT/EP2020/078454, having a filing date of Oct. 9, 2020, which claims priority to EP Application No. 19204807.2, having a filing date of Oct. 23, 2019, the entire contents both of which are hereby incorporated by reference.

FIELD OF TECHNOLOGY

The following relates to an electrical machine having a stator or a rotor with a segmented geometry, i.e., a stator or a rotor including a plurality of stator segments circumferentially joined together.

BACKGROUND

In large electrical machines, segmentation of the stator and/or the rotor structure is required to ease manufacturing and transportation. This is particularly required for stators or rotors where a winding is provided. The integral slot distributed winding and fractional slot concentrated winding are two options to realize a stator or rotor structure. The integral slot distributed winding suffers from large torque ripple and the fractional slot distributed winding suffers from large rotor eddy current loss. With the purpose of achieving small torque ripple and rotor loss simultaneously, the fractional slot machine with 2-slot-pitch winding may be a potential solution. However, due to the overlapping winding structure, the stator of the conventional 2-slot-pitch winding cannot be segmented, which prevents its application in large electrical machines.

SUMMARY

An aspect relates to a new segment design, for achieving the advantages above described, i.e., a segmented structure with smaller torque ripple and rotor loss in comparison with the segments designs of the conventional art.

According to embodiments of the invention, it is provided a segment for the stator or the rotor of an electrical machine including a segment body circumferentially extending about a longitudinal axis of the stator segment between two circumferential ends. The segment body includes:
  two end teeth at the two circumferential ends respectively, each end tooth having a first circumferential extension,
  a plurality of N intermediate teeth protruding according to a radial direction orthogonal to the longitudinal axis from a yoke of the segment body to respective tooth radial ends, the plurality of intermediate teeth being circumferentially distributed between the two end teeth, each of the plurality N intermediate teeth having a second circumferential extension greater than the first circumferential extension, N being an integer greater than 1,
  a plurality of N+1 slots circumferentially distributed between the two end teeth, each pair of circumferentially adjacent intermediate teeth having a slot interposed therebetween, a slot being provided between each end tooth and a respective circumferentially adjacent intermediate tooth.

The segment further includes:
  at least one 2-pitch coil, the 2-pitch coils being in the number of N−1 and extending between an i-th slot and a (i+2)-th slot, the slots being progressively counted from one to the other of the two circumferential ends, i being an integer between 1 and N−1.

The above-described segment may be integrated in a segmented stator or rotor of an electrical machine, either generator or motor. For example, the above-described segment may be integrated in the stator of an electrical generator for a wind turbine.

According to the above-described segment design of embodiments of the present invention, a spatial distribution of the magnetomotive force (MMF) may be achieved which contains very low subharmonics, which leads to extremely low rotor eddy current loss in the machine. The fractional slot design of embodiments of the invention achieves a significant reduction of the torque ripple in comparison with the conventional art. The end coils of each segment are physically protected by the circumferential end teeth, which makes it convenient for manufacture, transport and assembly.

According to embodiments of the invention, each slot includes a bottom portion adjacent to the yoke and a top portion radially opposed to the bottom portion, the at least one 2-pitch coil extends between a top portion of the i-th slot and a bottom portion of the (i+2)-th slot or between a bottom top portion of the i-th slot and a top portion of the (i+2)-th slot. This permits to achieve a double layer winding where torque ripple and rotor loss may be significantly reduced in comparison with conventional fractional slot winding schemes and conventional integral slot winding schemes.

According to embodiments of the invention, the segment further includes at least one 1-pitch coil between two circumferentially adjacent slots of the plurality of N+1 slots, the at least one 1-pitch coil being adjacent to one end tooth. In particular, the at least one 1-pitch coil may extend between two respective top portions or two respective bottom portions of the two circumferentially adjacent slots of the plurality of N+1 slots. In such embodiments each slot houses two coils according to a double layer scheme, i.e., one on the top radial portion and the other on the bottom radial portion. At the circumferential ends each slot may house one 2-pitch coil and one 1-pitch coil. Alternatively, at the circumferential ends each slot may house only one 2-pitch coil, at the bottom portion or at the top portion, i.e., at the circumferential ends each slot may be half filled, while each slot between the slots at the circumferential ends houses two 2-pitch coils.

BRIEF DESCRIPTION

Some of the embodiments will be described in detail, with reference to the following figures, wherein like designations denote like members, wherein.

DETAILED DESCRIPTION

Figure 1:
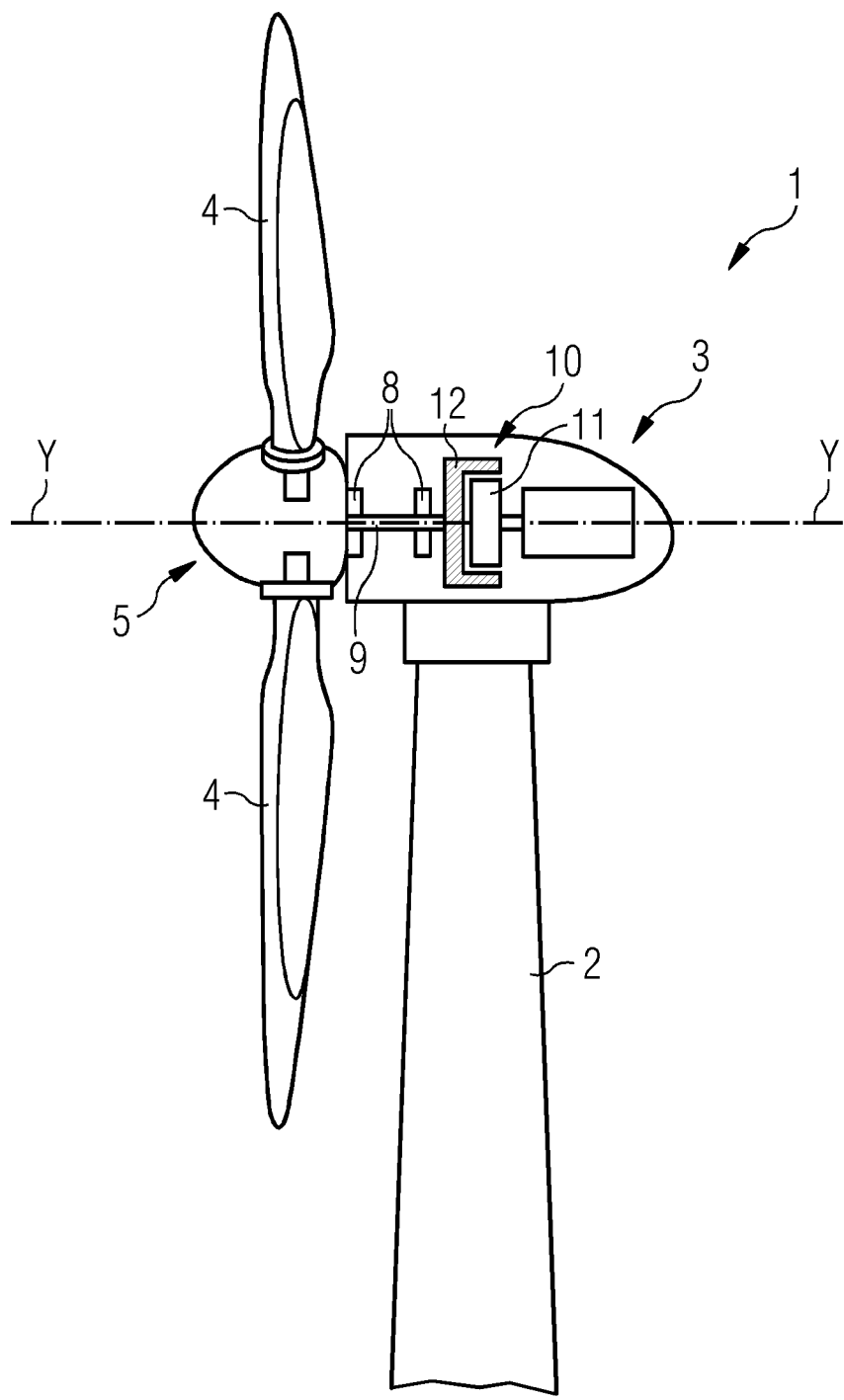
FIG. 1 shows a schematic section of a wind turbine including an electrical generator with a stator geometry according to embodiments of the present invention.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y. The blades 4 extend radially with respect to the rotational axis Y. The wind turbine 1 comprises a concentrated winding electrical generator 10. The wind rotor 5 is rotationally coupled with the electrical generator 10 by a rotatable main shaft 9. According to other possible embodiments of the present invention (not represented in the attached figures), the wind rotor 5 is rotationally coupled directly with the electrical generator 10 (direct-drive generator configuration). A schematically depicted bearing assembly 8 is provided to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator. According to other possible embodiments of the present invention (not represented in the attached figures), embodiments of the present invention can be applied to any electrical generator or motor which has concentrated winding topology, for example geared drivetrains or electrical machine of the synchronous or asynchronous types.

According to other possible embodiments of the present invention (not represented in the attached figures), embodiments of the present invention can be applied to any electrical generator or motor which has a fractional slot concentrated winding.

Figure 2:
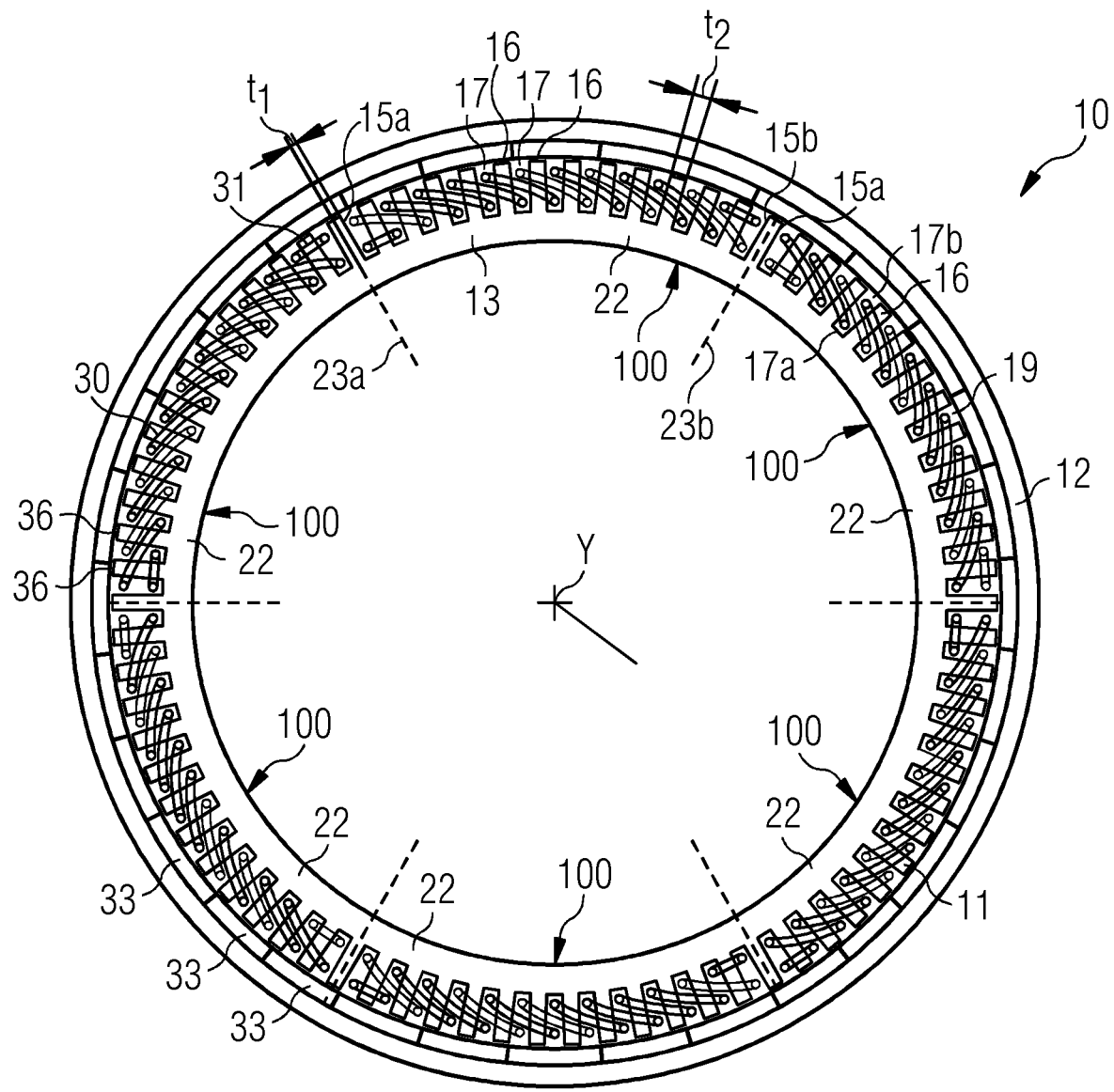
FIG. 2 shows a cross section of an electrical generator in accordance with a first embodiment of the present invention.

FIG. 2 shows a schematic view of a cross section, orthogonal to the rotational axis Y, of a first embodiment of the electrical generator 10 with radially internal stator 11 and the radial external rotor 12. The electrical generator 10 includes a circumferential air gap 19, radially interposed between the stator 11 and the rotor 12. The rotor 12 includes plurality of circumferentially distributed permanent magnets 33. The circumferential air gap 19 is radially interposed between the permanent magnets 33 and the stator 11. The stator 11 includes a plurality of circumferential segments 100 (six segments 100 in the embodiment of FIG. 2, each segment 100 having an angular extension about the longitudinal axis Y of 60°), which are circumferentially joined together. According to other possible embodiments of the present invention (not represented in the attached figures), embodiments of the present invention and the description which follows is applied to a rotor of an electrical machine.

Each segment 100 includes a segment body 22 circumferentially extending about the longitudinal axis Y between a first circumferential end 23a and a second circumferential 23b. In the exemplary representation of FIG. 2 each segment span clockwise between the respective first circumferential end 23a and the respective a second circumferential 23b. The segment body 22 includes a yoke 13, from which a plurality of teeth 15a, 15b, 16 and a plurality of slots 17 radially protrudes. The teeth 15a, 15b, 16 and the plurality of slots 17 are circumferentially distributed as follows.

A first end tooth 15a is provided at the first circumferential end 23a and a second end tooth 15b is provided at the second circumferential ends 23b. Each end tooth has a first circumferential extension or thickness t1. The plurality of circumferential segments 100 are joined together by joining together the first end tooth 15a of one segment 100 with the second end tooth 15b of another segment 100. Any joining may be used. A plurality of N (N=12 in the embodiment of FIG. 2) intermediate teeth 16 protrude according to a radial direction orthogonal to the longitudinal axis Y from the yoke 13 to respective tooth radial ends 36. The plurality of intermediate teeth 16 are circumferentially distributed between the two end teeth 15a, 15b. Each of the plurality of N intermediate teeth 16 having a second circumferential extension or thickness t2 greater than the first circumferential extension t1. According to possible embodiment of the present invention, t2 may equal to two times of t1. A plurality of N+1 slots 17 (i.e., thirteen slots in the embodiment of FIG. 2) are circumferentially distributed between the two end teeth 15a, 15b. Each pair of circumferentially adjacent intermediate teeth 16 has a slot 17 interposed therebetween. A slot 17 is also provided between each end tooth 15a, 15b and a respective circumferentially adjacent intermediate tooth 16. The segment 100 further includes plurality of N−1 2-pitch coils 30 (i.e., eleven 2-pitch coils in the embodiment of FIG. 2). Each 2-pitch coil 30 is wound between an i-th slot and a (i+2)-th slot, i being an integer ranging between 1 and N−1 (i.e., i=1,2, . . . ,11 in the embodiment of FIG. 2). The coils 30 are wound according to a fractional slot winding scheme. Considering the slots being progressively counted from the first circumferential end 23a to the second circumferential end 23b, a first 2-pitch coil 30 is wound between the first slot and the third slot, a second 2-pitch coil 30 is wound between the second slot and the forth slot and so on up to the eleventh 2-pitch coil 30 that is wound between the eleventh slot and the thirteen and last slot.

Each slot 17 extends radially so that it includes a bottom portion 17a adjacent to the yoke 13 and a top portion 17b radially opposed to the bottom portion 17a. In the embodiment of FIG. 2, the 2-pitch coils 30 extends between a top portion of the i-th slot and a bottom portion of the (i+2)-th slot. According to other embodiments of the invention (not shown) the 2-pitch coils 30 extends between a bottom portion of the i-th slot and a top portion of the (i+2)-th slot. According to other embodiments of the invention (not shown) the 2-pitch coils 30 extends between a bottom portion of the i-th slot and a bottom portion of the (i+2)-th slot. According to other embodiments of the invention (not shown) the 2-pitch coils 30 extends between a top portion of the i-th slot and a top portion of the (i+2)-th slot. The above-described winding is a double-layer winding, where each slot 17 may include one coil at the bottom portion 17a and one coil at the top portion 17b.

Each segment 100 further includes a first 1-pitch coil 31 adjacent to the first end tooth 15a and a second 1-pitch coil 31 adjacent to the second end tooth 15b. According to above considered slot counting, the first 1-pitch coil 31 is wound between the first slot and the second slot and the second slot is wound between the last ((N+1)-th) slot and the previous next to last (N-th) slot. In the embodiment of FIG. 2, the first 1-pitch coil 31 is wound between two respective bottom portions 17a of the first slot and the second slot. According to other embodiments of the invention (not shown), the first 1-pitch coil 31 is wound between two respective top portions 17b of the first slot and the second slot. The 1-pitch coil 31 may be wound between the portions of slots left free from the 2-pitch coil 30. Similarly, in the embodiment of FIG. 2, the second 1-pitch coil 31 is wound between two respective top portions 17b of the last ((N+1)-th) slot and the previous next to last (N-th) slot. Alternatively, the second 1-pitch coil 31 may be wound between two respective bottom portions 17a of the last ((N+1)-th) slot and the previous next to last (N-th) slot. In the embodiment of FIG. 2, each of the thirteen slots 17 includes two 2-pitch coils 30 or one 2-pitch coil 30 and one 1-pitch coil 31. Namely, the first two slots and the last two slots includes one 2-pitch coil 30 and one 1-pitch coil 31.

Compared with the conventional 2-slot-pitch winding with its tooth number equal to the total number of the intermediate teeth 16, embodiments of the present invention have a greater number of the permanent magnets 33 on the rotor 12. The increased permanent magnet 33 number i may be any integer greater than 1, i.e., i may be 2,3 . . . . etc.

Figure 3:
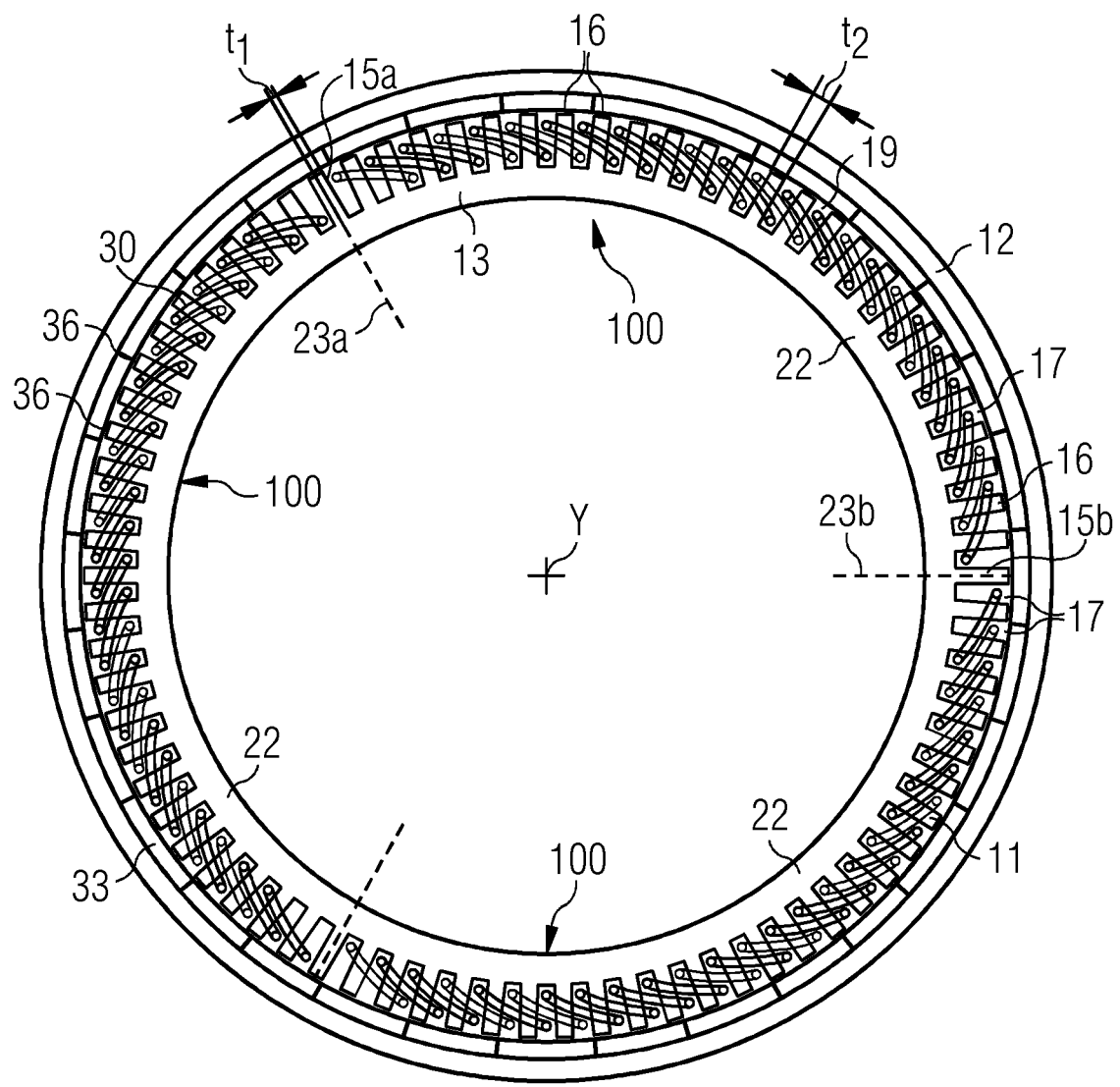
FIG. 3 shows a cross section of an electrical generator in accordance with a second embodiment of the present invention.

FIG. 3 shows a schematic view of a cross section, orthogonal to the rotational axis Y, of a second embodiment of the electrical generator 10. This second embodiment differentiates itself from the first one in that the stator 11 includes three circumferential segments 100, each segment 100 having an angular extension about the longitudinal axis Y of 120°, in that N=25 and in that only 2-pitch coils 30 are wound on the teeth (no 1-pitch coils is present). Consequently, the first two slots and the last two slots includes only one 2-pitch coil 30 and are therefore only half filled.

According to other embodiments of the present invention (not shown) the stator 11 (or the rotor 12) may include any plurality of segments 100, i.e., two or more segments.

According to other embodiments of the present invention (not shown) the number N of intermediate teeth 16 may be any integer greater than 2, i.e., N may be 2,3 . . . . etc. In the smallest possible version of a segment 100, i.e., with N=2, the segment 100 includes the first end tooth 15a, the second end tooth 15b, two intermediate teeth 16, three slots 17 and one 2-pitch coil 30 extending between the first and the third (last) slot. Two 1-pitch coils respectively between the first and the second slot and between the second and the third slot may be optionally present.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "device" does not preclude the use of more than one unit or device.

The invention claimed is:

1. A segment for a stator or a rotor of an electrical machine comprising:
    a segment body circumferentially extending about a longitudinal axis of the segment between two circumferential ends, the segment body including:
    two end teeth at the two circumferential ends respectively, each end tooth having a first circumferential extension;
    a plurality of N intermediate teeth protruding according to a radial direction orthogonal to the longitudinal axis from a yoke of the segment body to respective tooth radial ends, the plurality of N intermediate teeth being circumferentially distributed between the two end teeth, each of the plurality of N intermediate teeth having a second circumferential extension greater than the first circumferential extension, N being an integer greater than 1;
    a plurality of N+1 slots circumferentially distributed between the two end teeth, each pair of circumferentially adjacent intermediate teeth having a slot interposed therebetween, the slot being provided between each end tooth and a respective circumferentially adjacent intermediate tooth;
    a plurality of 2-pitch coils, the plurality of 2-pitch coils being in a number of N−1 and extending between an i-th slot and a (i+2)-th slot, the slots being progressively counted from one to the other of the two circumferential ends, i being an integer between 1 and N−1;
    a plurality of 1-pitch coils between two circumferentially adjacent slots of the plurality of N+1 slots, a first 1-pitch coil being adjacent to a first end tooth and a second 1-pitch coil being adjacent to a second end tooth; and
    a fractional slot winding including the plurality of 2-pitch coils and the plurality of 1-pitch coils;
    wherein each of the plurality of N+1 slots include a bottom portion adjacent to the yoke and a top portion radially opposed to the bottom portion, the plurality of 2-pitch coils extending between a top portion of the i-th slot and a bottom portion of the (i+2)-th slot or between a bottom portion of the i-th slot and a top portion of the (i+2)-th slot.

2. The segment as claimed in claim 1, wherein each of the plurality of N+1 slots include at least one 2-pitch coil.

3. The segment as claimed in claim 1, wherein the plurality of 1-pitch coils extend between two respective top portions or two respective bottom portions of the two circumferentially adjacent slots of the plurality of N+1 slots.

4. The segment as claimed in claim 1, further comprising a double-layer winding including in each of the plurality of N+1 slots two 2-pitch coils or one 2-pitch coil and one 1-pitch coil.

5. The segment as claimed in claim 1, wherein first circumferential extension is a half of the second circumferential extension.

6. A stator or rotor for an electrical machine including a plurality of segments as claimed in claim 1, wherein the plurality of segments are circumferentially joined together in such a way that two respective end teeth are joined together.

7. An electrical machine including a stator or rotor as claimed in claim 6.

8. A wind turbine including an electrical generator including a stator or rotor as claimed in claim 6.

* * * * *